United States Patent [19]

Pohl

[11] 4,096,016
[45] Jun. 20, 1978

[54] PROCESS FOR MAKING AND USING HIGH FREQUENCY WELDABLE MATERIAL

[76] Inventor: Gerhard Pohl, Professorenweg 33, Glessen, Germany

[21] Appl. No.: 638,415

[22] Filed: Dec. 5, 1975

Related U.S. Application Data

[60] Continuation of Ser. No. 355,955, Apr. 30, 1973, abandoned, which is a division of Ser. No. 3,950, Jan. 9, 1970, Pat. No. 3,734,813.

[30] Foreign Application Priority Data

| Jan. 25, 1969 | Germany | 1903667 |
| Mar. 15, 1969 | Germany | 1913209 |
| Jun. 10, 1969 | Germany | 1929352 |
| Jul. 16, 1969 | Germany | 1936199 |

[51] Int. Cl.² ............................................. B29C 19/04
[52] U.S. Cl. ................................. 156/274; 29/121.1; 29/121.2; 156/283; 156/380; 156/291; 156/548; 156/322; 427/197; 428/206; 428/327; 428/283
[58] Field of Search ............... 156/273, 322, 274, 324, 156/283, 380, 291, 548, 313, 549, 320, 551, 497; 427/180, 211, 197; 118/244; 29/121.1, 121.2; 428/201, 245, 206, 283, 240, 327, 474

[56] References Cited

U.S. PATENT DOCUMENTS

| 2,393,529 | 1/1946 | Harrigan | 29/121.2 |
| 2,746,898 | 5/1956 | Buckwalter et al. | 156/283 |
| 2,859,153 | 11/1958 | Zucht | 156/273 |
| 3,098,235 | 7/1963 | Gusman | 156/283 |
| 3,348,995 | 10/1967 | Baker et al. | 156/283 |
| 3,359,127 | 12/1967 | Meyer et al. | 428/474 |
| 3,393,119 | 7/1968 | Dugan | 156/273 |
| 3,463,690 | 8/1969 | Converse et al. | 156/291 |
| 3,535,197 | 10/1970 | Fishbein et al. | 428/311 |

FOREIGN PATENT DOCUMENTS

| 1,223,413 | 2/1971 | United Kingdom | 156/322 |
| 886,746 | 1/1962 | United Kingdom | 156/283 |

Primary Examiner—William A. Powell
Assistant Examiner—J. J. Gallagher

[57] ABSTRACT

Discrete particles consisting of thermoplastic synthetic resin, which are adapted to melt and to produce a high frequency weld joint under the action of a high frequency field and to resist the action of detergents and dry cleaning agents are arranged on at least one boundary surface of a support structure which is permeable to gas, vapor and liquid, and which is preferably constituted by a continuous web to which the particles are preferably fixed by the application of pressure and/or heat. An additional layer, preferably also consisting of a continuous web, is then applied to the one boundary surface of the support structure and the thus-formed composite structure is subjected to the action of a high frequency field to provide a welded joint connecting the additional layer to the support structure.

16 Claims, 7 Drawing Figures

PROCESS FOR MAKING AND USING HIGH FREQUENCY WELDABLE MATERIAL

CROSS-REFERENCE TO RELATED APPLICATION

The present application is a continuation application of the copending application Ser. No. 355,955, filed Apr. 30, 1973, now abandoned, which in turn is a divisional application of the application Ser. No. 3,950 filed Jan. 9, 1970, now U.S. Pat. No. 3,734,813.

BACKGROUND OF THE INVENTION

The demand for consumer goods such as mattresses, quilts, side parts of motor vehicles, room decorations, garments, mattress cover pads, diamond-quilted covering featherbeds, side and rear parts of easychairs, couches, couch seat covers, profiled backs of upholstered furniture, to mention only some, has suddenly increased so that the manual work must be eliminated which was previously required, e.g., to make quilted seams. The invention is based on the recognition that high-frequency seam welds are to be used instead of manually made quilted seams because high-frequency welding is an optimum method meeting the requirements which arise when fabrics of all kinds consisting of textile fibers and containing a filler or no filler must be profiled. In the high-frequency field, only the dipolar plastics material which is incorporated as a bonding material between the textile fabrics or webs to be joined by welding is heated to its melting point and subjected to pressure so that it begins to flow and will constitute the so-called seam weld having a very high strength whereas the sheets to be joined by welding are not subjected to an appreciable temperature rise so that the properties possessed by the unjoined sheets are not adversely affected, different from all other thermal bonding processes. A bonding material is required because a number of textile materials which are used can be welded only with difficulty. This applies, e.g., to foamed plastics materials, such as polyurethane foams, although polyurethane foams are of great importance as a filler for cushions, pads, linings of motor vehicle bodies, airplane cabins etc. so that dipolar plastics materials, particularly synthetic resins, must be provided between the so-called cold electrode or anode forming the so-called working plate and the hot counterelectrode, which has the configuration of the required seam weld, in order to ensure that the electron current flowing in the high-frequency field between the anode and cathode causes the dipoles contained in the dipolar plastics material to become aligned. The weldability of a plastics material in a high-frequency electric field depends on the welding factor, which is equal to the product of the dielectric constant, which is a measure of the insulation resistance of the dielectric, and the difference between $\pi/2$ and the tangent of the phase angle between current and voltage. The above-mentioned tangent of the last-mentioned angle delta depends on the alignment of said dipoles. If the product representing the welding factor is sufficiently high, the losses of electric energy will be converted into heat, which causes a melting of plastics materials, particularly synthetic resins, which are used as dipolar materials.

Hereinbefore, the physical processes have been stated which enable the use of high-frequency welding for joining virtually all textile fabrics in question by high-frequency seam welds so as to form composite webs or composite bodies and particularly to impart a profile thereto. Other requirements to be met arise because consecutively arranged machines, cyclic and production line processes are required for the sake of economy. As a result, only relatively short periods of time are available for joining the individual webs in a composite web. This requirement is also met by high-frequency welding in a particularly high degree because the electric energy loss which is converted into heat can be selected as required without difficulty. Additional requirements arise because of the desire for a high quality of the product. For instance, the flexibility and grip of the starting textile fabrics must not be adversely affected. More particularly, there must be no embrittlement along the seam welds, regardless of whether these seams form dots, lines or strips. Another requirement is at least as important and resides in that the provision of such high-frequency seam welds must not alter the laundering and dry-cleaning properties of the products. For this reason, the bonding materials must resist detergents and dry-cleaning agents. Another requirement, which is just as important, resides in that the products must be permeable to gas (air) and liquid (moisture, vapor, sweat) so that garments made from such products will not distract from the comfort of the wearers thereof. The last-mentioned processing involves another requirement, which resides in that the bonding substances must be selected so that the layers in question may be joined by the processor himself so that this joining need not be effected where the material is made. For instance, if a manufacturer of garments desires to make a man's jacket having a predetermined, fitting shape, which should be durable, the product which supports the jacket fabric and imparts shape to it and holds it in shape must be adapted to be cut in the garment factory so that a conventional ironing operation is sufficient to stiffen and reinforce the outer fabric as may be desired. The above remarks do not fully define the requirements to be met and the technical objects based thereon. The listing is to be concluded by a reference to a particularly important requirement, which resides in that the required economy must be ensured in spite of the fact that the product is of optimum quality. It will be outlined below that this requirement can also be met by the invention.

Based on known materials which can be high frequency-welded, all objects mentioned above are accomplished according to the invention in that the material comprises a support, which is rustleproof and permeable to air and moisture and which carries particles of synthetic thermoplastic resins, such as polyamides, which resist washing and dry-cleaning and which are adapted to establish a bond under the action of high-frequency energy. As a result, the particles of synthetic resin may be provided on and fixed to the support in such a manner that they are discrete particles in the form of dust, powder, grains or agglomerates and assist the welding in dependence on the size and form of electrodes which are subjected to the high-frequency field. A number of advantageous possibilities reside in the arrangement of the particles in a geometrically ordered dot pattern. For instance, the particles may be arranged to form a preferably ordered line pattern, which may surround fields forming parallelograms having equal pairs of sides (rhombi).

It has already been pointed out that polyamides meet the requirements to be fulfilled as regards the resistance to detergents and dry-cleaning agents. Modified polyamides have the same property and additional properties, e.g., a high wear resistance. Modified polyamides are formed by a co-extrusion of a plurality of different types of homopolyamide granules to form so-called block copolyamides, which have melting temperatures and other properties lying in accordance with a virtually linear function between those of the homopolyamides forming these modified polyamides. The macromolecules comprise long blocks of the individual polymeric components; the length of these blocks depends on the degree of polymerization of the homopolyamides which are employed. Because the short residence time at elevated temperatures permits of only a slight conversion, these modified block copolyamides are in part only a physical blend of the components. True copolyamides of the type Nylon 6/6, 6/12 differ from the block copolyamides in that they exhibit a statistical distribution of the monomeric units in the macromolecule and are polyamides having modified properties. The crystallinity is reduced because hydrogen bridges cannot form to an appreciable extent. Depending on the composition in percent, the melting point is lowered and reaches a minimum in a eutectic mixture. Although such modified copolyamides are relatively expensive, their use within the scope of the present invention is still economical because surprisingly small amounts of the modified polyamide are sufficient to provide for the required bonding strength under the special conditions of high-frequency welding.

Copolyamides consisting of polycondensation products of hexamethylene diamine and adipic acid have proved particularly desirable. The same applies to products of epsilon-aminocarproic acid. Other suitable substances include polyamides of 7-aminoheptanic acid, 9-aminononanic acid, 10-aminodecanic acid, 11-aminoundecanic acid, as well as polyamides based on dodecalolactam or polylaurinlactam.

The bonding material may be provided on one or both of the boundary surfaces of the support. For instance, the bonding material provided on a boundary surface of the support may be enclosed between the latter and, e.g., a textile fabric or another layer which seals and covers the support, e.g., by sheeting which is made of various materials and which instead of a single covering layer may consist of a plurality of layers or a composite material. If the bonding material is provided on both boundary surfaces of the support, it will be inherent in this embodiment that the bonding material deposited on the support will be provided on each side of the support between the latter and a covering layer or set of layers.

The support may consist of a wide range of materials, preferably of foams, including polyurethane ester foams, non-woven fabrics, woven fabrics, bobinets, knitted fabrics, stitchable knitted fabrics, needle-punched pile fabrics, textile fabrics having adhered tufts, foam-bonded textile fabrics, cellulose, wadding and felt. The non-woven fabrics may have been formed by mechanical, aerodynamic and hydrodynamic methods as well as by spinning. Non-woven fabrics include also flexible bonded non-woven fabrics as well as bonded spun non-woven fabrics. These bonded non-woven fabrics may be mechanically or adhesively bonded, e.g. with or without a bonding agent, or they may consist of expanded or needle-punched non-woven fabrics. Reference should also be made in this connection to reinforced non-woven fabrics, which may be reinforced by arrays of filaments or threads, woven fabrics, knitted fabrics, nettings and plastics material sheeting.

Covering layers may be joined by calendering on one or both sides.

It has been mentioned hereinbefore that cellulose may be used as a material for the support carrying the particles of synthetic resin used as a bonding material. This is of great importance because it enables the support to be made from all thin sheets of felted fibers. Even a few fiber layers or only a single fiber layer will be sufficient for an adequate fixation of the minute amounts of particles of synthetic resin which are required in practice and for such a reliable support thereof that the support can be sold as such, particularly if it consists of wound-up fiber layers. The thickness of the support may be as large as or smaller than the largest dimension of a particle of synthetic resin provided on the support. The required economy will be particularly obtained if the fibers of the support consist of cellulose. The resulting support has a cellulose-like structure or consists of cellulose.

Thin sheets of foam are just as important. The support can perform the required functions even if it has a thickness of only 1.00–1.50 millimeters. The use of a smaller thickness is prevented only by the fact that the handling becomes difficult in practice. Such thin layers of plastics material may be produced by a peeling operation. The means which are available have been used to make sheets of foam which have the above-mentioned thickness of 1.00 millimeter and a smaller thickness throughout their area. This does not preclude the manufacture of even thinner foam layers by improved processes.

An upper limit is imposed by the requirement that the high-frequency welding must be uniform. The upper limit which has been numerically stated will vary with the high-frequency welding technology so that the figures stated are based only on the present state on the art in the fields concerned. The manufacture of a support having the small thickness stated without impairing the handling of the support, which must be considered a finishing material, can be performed in a simple manner if the foam consists of a polyurethane ester whereas, e.g., polyurethane ethers are less suitable or may even be unsuitable. Nevertheless, a tender and light-weight structure thus formed may be shipped well in the form of rolls and may be used in machines without danger of damage and may be handled in all other ways in question. It has been found, above all, that extremely favorable results may be obtained in the subsequent welding operation because a perfectly uniform distribution of the plastics material over the surface in question may be accomplished. The uniform distribution of the particles of bonding material throughout the surface of the finishing material results in perfectly uniform, homogeneous seam welds. If the particles of plastics material ar provided in a sufficiently dense distribution, these seam welds will no longer have a structure which can be recognized but will form the above-mentioned, continuous, homogeneous weld layer, which has a desirable durability and uniform response to the stresses applied. Particularly great advantages will be obtained because each particle of bonding material is used for welding whether it is directly subjected to the thermal influences during the welding on one boundary plane or on both boundary planes or between the two boundary planes of the support consisting of a thin sheet of foam. Although the particles of plastics materials which form dots or may have been rolled to form platelets or lenticles have a thickness which is virtually negligible relative to the other dimensions, such particle in the form of a dot, platelet or lenticle is entirely utilized for welding. As a result, an extremely small amount of plastics material per unit of welding area is sufficient so that the support on the one hand and the plastics material carried by the support on the other hand enable a very high economy to be achieved in the making and unwinding of the support and in the making of the plastics material carried by the support and in the operation of the machine used for these purposes.

Additional advantages are due to the fact that it is no longer necessary to use dispersions, which have virtually restricted the choice of plastics materials to PVA and/or PVC synthetic resins, which resist neither laundering nor dry-cleaning, although this is a great disadvantage. Besides, they can be dissolved by solvents, different from plastics materials which resist laundering and dry-cleaning and which can be applied directly without need to use a dispersion.

It is known to provide dressing materials consisting of individual layers joined by welding, preferably high-frequency welding, with bonding material inserts or facings in different main forms. To provide a so-called welding finish, non-woven fabrics have been sprayed with synthetic resins in the form of dispersions of synthetic resins consisting of polyvinylacetate and/or polyvinylchloride so that a marketable product was obtained when the dispersed particles of synthetic resin had been solidified. Composite materials required to have one or more layers of materials which have poor welding properties or which are adversely affected by a welding operation resulting in proper seam welds were made with the aid of machines for performing one or more needle punching operations so that the polyurethane foams, which were mainly used, were provided with an infinite number of stitch holes. The resulting fabrics enabled or improved the welding of the layers of dressing material in question. In a third process which has been used, those layers which cannot readily be welded to other materials were surface heat-treated at temperatures at which the boundary surfaces in question were at least tacky or even resulted resulted in the formation of a joint which can be described as a welded zone.

Papers, preferably in the form of tissue papers, which have been impregnated or coated with a solution of polyvinylchloride, have also been used in the high-frequency welding of foams. Tissue paper, however, is not a rustleproof support and lacks the essentially required permeability to air and water (moisture, sweat). An additional disadvantage resides in that the materials are highly embrittled along the welded zones. The feeding of strips and webs of paper involves a certain structural expenditure and a risk of a lateral displacement of the material to be welded relative to the bonding material. As a result, only straight-lined welded zones can be formed in this way whereas ornaments and curved welded zones cannot be obtained, unless the bonding material is adhered to one of the materials to be welded.

It is known to use bonding materials in powder form. In these processes, the synthetic resin powder is introduced directly into the zone of contract between the materials to be welded. As a result, joining processes must be carried out immediately after the manufacture of the materials to be welded whereas it has been possible according to the invention to provide a support which carries the particles of synthetic resin and which is available wherever the processing operations require a subsequent high-frequency welding, independently of the manufacture of the materials to be welded. This practice meets the above-mentioned requirement that the bonding material should be available whenever and wherever it is needed. The above-mentioned synthetic resin powders have been made only of polyvinylacetate (PVA), polyvinylchloride (PVC), polyvinylpropionate, polyvinylidenechloride, acrylic ester, and their copolymers. These plastics materials resist neither detergents nor dry-cleaning agents. The synthetic resins used in accordance with the invention and consisting of modified polyamides, e.g., those described as modified polyamides under the name Nylon 6/6, 6/12, resist detergents and dry-cleaning agents and have other desirable properties. Besides, the finishing materials and processes which have been disclosed before are not entirely satisfactory from the economic and/or technological aspects. The distribution of the particles of synthetic resin cannot be fully controlled unless the processes are employed which will be described hereinafter. The non-woven fabrics which have been used are relatively expensive and their cost cannot be adequately lowered even when they are made in large quantitites. Needle punching methods result in a considerable reduction of the strength of the needle-punched fabrics and/or layers becuase the penetration of the needles inevitably destroys or at least loosens the structure of the material at the penetration points. The surface heat-treating process may be carried out with success only by highly experienced, skilled persons which have had years of training and inevitably involves considerable dangers in operation.

SUMMARY OF THE INVENTION

The difficulties mentioned above may be avoided in the process according to the present invention, which is characterized in that at least one rustle-proof support, which is permeable to air and moisture, is provided with particles of thermoplastic synthetic resins, such as polyamides, which are resistant to detergents and dry-cleaning agents, the support is combined with at least one additional layer to form a composite material, preferably in the form of a web, and the material or web is shaped into a three-dimensional, profiled material by means of electrodes which are subjected to a high-frequency field. The desired distribution is obtained in that particles of synthetic resin in the form of dust, powder, grains and/or preferably agglomerates are arranged in an array, preferably in the form of a dot or line pattern, and a support is applied, preferably under pressure, to the array so that the latter is transferred to a boundary surface with which the support contacts the array. The particles of synthetic resin which have been transferred to the support may be fixed to the latter. Alternatively, the particles may be sintered to the support at the same time or thereafter. If the support is to be covered with a textile fabric, it will be sufficient to apply the fabric, preferably by rolling, at elevated temperature to a boundary surface of the support, which surface is provided with the plastics material. This operation will result in a composite material. If the support is to be provided with plastics material on both sides, additional plastics material in the form of dust, powder and/or grains or, if desired, in the form of small agglomerates, is formed into an array, suitably after the application of plastics material on the first boundary surface of the support, and that boundary surface of the support which has not been provided with plastics material during the first application thereof and which is opposite to the surface previously provided with plastics material is applied, preferably under pressure, to the array of plastics material, whereby the latter is transferred. If the first application of plastics material was carried out at elevated temperatures or if treating operations have succeeded which have resulted in elevated temperatures of the support, it will be suitable to cool the support before the second application of plastics material so that the plastics material on the side provided therewith first will not be adversely affected until such action must be taken intentionally during the final treatment of the plastics material which has been applied. It has already been stated that the first application of plastics material may be carried out at a temperature above room temperature because during the first application of plastics material the support is free of plastics material which could be adversely affected by the heat treatment. The plastics material applied in the second application step may subsequently be fixed to the support or may be sintered to the support at the same time or thereafter. It will be understood that additional steps may be adopted to introduce particles of plastics material into the support and to carry out the above-mentioned heat treatments thereafter. However, the provision of plastics material on the surface of the support has proved entirely sufficient to enable the further treatments.

If the support provided with plastics material is moved at a speed which is lower than the speed at which the support is moved during the application of plastics material, a sickle-shaped gap will be formed between the surface of any conveying and distributing rolls which are employed and the material or web which has been provided with plastics material. This sickle-shaped gap is desirable for various reasons. The force of gravity acting in this sickle-shaped gap causes a dropping of those particles which have not been transferred to the material or web to which they have been applied or pressed. This effect may be promoted in that vibration is imparted to the conveying and distributing means. Such vibration will be produced, e.g., if a conveying or distributing roll is rapped. Such rapping is preferably rhythmic or periodic. A direct contact between the conveying and distributing surface of rolls or belts used for this purpose and the surface of the material or web provided with plastics material is avoided so that the generally ordered distribution of the plastics material will not be changed.

If a support provided with plastics material on both sides and materials or webs which are joined to the support on both sides thereof are introduced into the same nip between the rolls of a calender, preferably at elevated temperatures, in order to form a composite material, the provision of plastics material on the support may be immediately succeeded by the manufacture of the composite material so that the elevated temperatures existing e.g., during the fixing and sintering operations may be economically utilized in the manufacture of the composite material. What has been said in connection with a joint on both sides of the support will also be applicable if the support is covered only on one side with additional materials in one or more layers.

With reference to the above-mentioned processes, in which synthetic resin in the form of discrete particles is applied in a state of incipient or advanced or complete plasticization to the support or a support web, certain modifications of the process will be possible if the particles are to be transferred to supports in the form of thin sheets, which may consist of only one layer of fibers. For instance, the particles of synthetic resin which have been transferred to the support may be spread by rolling to form flattened islets, which penetrate into or through the support and at least partly displace or replace material of the support and preferably impart a structure to the surface of the support. If the rolling does not spread the particles to such an extent that at least one boundary surface of one islet lies in at least one boundary plane of the support, particularly if the latter consists of a web, so that the rolled islet is at least embedded in or forms the support web in this portion, the islets at least on one side of the support web will have the shape of lenticles so that a support made by this process assumes the above-mentioned structured appearance in dependence on the degree of distribution of the roll-spread particles of plastics material. Owing to the higher transparency and the altered reflectance of the platelets or lenticles of synthetic resin the support appears to be covered by a filay filter paper having a honeycomb pattern. This appearance is due to the fact that the particles have been subjected to interrupted sintering and solidified in the form of glasslike islets so that the particles have been slightly drawn in toward the other boundary surface of the support. Smooth rather than relief-like roll surfaces are used on the side of this other boundary surface so that the latter is not affected by these profiling and structuring operations but remains substantially smooth. Due to this appearance, finishing materials made according to the invention can be recognized even by the naked eye. The same result will also be obtained if the particles are applied in a more or less uniform distribution at room temperature rather than at elevated temperatures and the heat treatment resulting in an at least incipient sintering is carried out thereafter. It is also possible to join the support web immediately after the particles of plastics material have been transferred thereto and when the same are still in a plastic state. Alternatively, the plastics material may be subjected to at least one additional heat treatment between the manufacture of the support web and the joining thereof to at least one layer of the composite material to be made so that any tendency of the support to bond to the layer contacted with it in the formation of the composite material will be re-established in a lower, equal or higher degree if such tendency had been produced by the at least incipient sintering of the particles of plastics material and has subsequently been reduced or even eliminated. Such thermal aftertreatment will be particularly desirable if at least one additional layer or web or another part of a composite is not joined to the support immediately after the manufacture of the finishing material proposed by the invention but at a later time, e.g., after the material has been handled within the manufacturing plant or sent from one plant to another. What has been said in connection with at least one layer of the composite material will also be applicable if any desired number of individual layers of the same material are used to form a composite layer having a larger thickness. The finishing material according to the invention may thus be used to bond layers of any desired thickness so as to form plates and bodies, in which the welded zones remain just as flexible as the adjoining layers joined by the welded zone, or in which stiffer zones and gradual transitions are provided, so that the utility of the composite will be ensured or intentionally increased. These effects will depend on the amount and/or nature of the plastics material which is employed.

The above remarks made in connection with supports consisting of thin or very thin layers of cellulose are also applicable to thin or very thin layers of foam. It has been found that the support will perform its function even when it has a thickness of only 1.00–1.50 millimeters as has been stated above.

Further details and advantages of the invention will be explained with reference to drawings which diagrammatically illustrate apparatus for carrying out the process according to the present invention.

DESCRIPTION OF THE PREFERRED EMBODIMENTS

Figure 1:
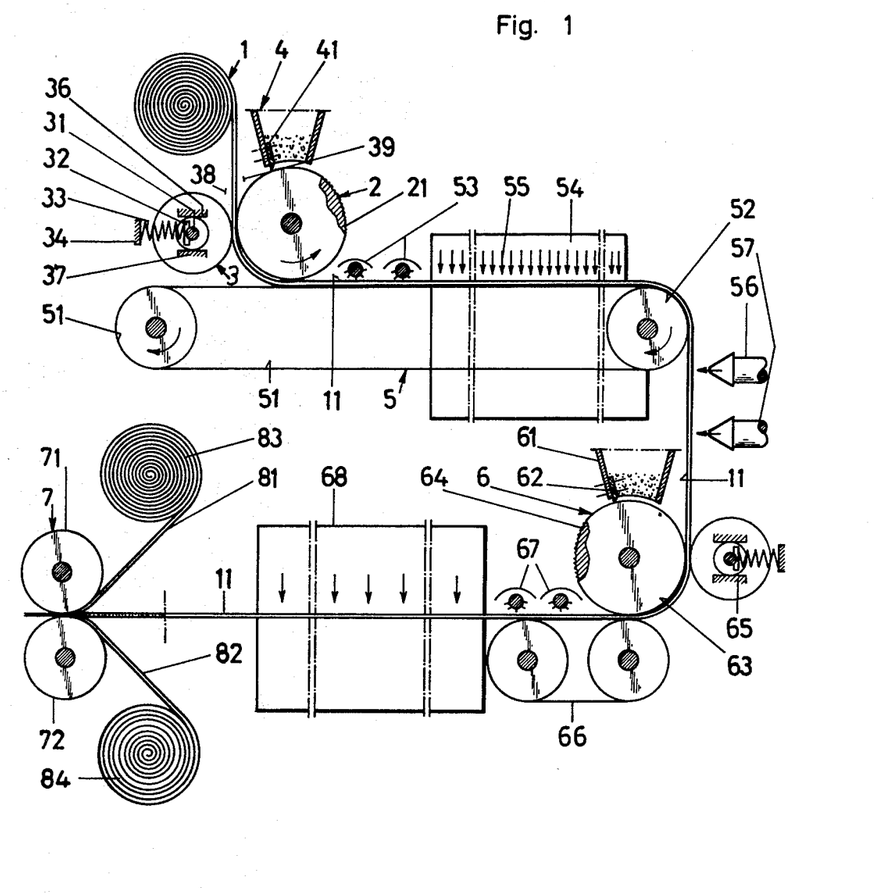
FIG. 1 shows an embodiment of apparatus for manufacturing a composite web according to the invention, which web consists of the support for specially shaped particles of synthetic resin, and of two layers applied to both sides of the support, which constitutes an intermediate layer. Such composite web is then subjected to further processing and a desired profile is imparted thereto by high-frequency welding.

FIG. 1 shows a roll 1, which consists of a thin sheeting of cellulose or foam. This sheeting is to be processed to form a bonding material core or facing according to the invention. For this purpose, a set of two rolls 2, 3 is provided. The first of these rolls constitutes a conveying and distributing means. To this end, surface 21 of the roll 2 is structured in that it has numerous depressions and boss-like projections. The depressions have the shape of small cups having such a size, shape and depth that each cup can receive at least one particle of a ternary copolyamide of the type Nylon 6/6, 6/12 consisting of a commercially available modified polyamide in the form of dust, powder or grains. A supply of the synthetic resin powder is contained in a hopper 4 disposed above the roll 2. The hopper 4 contains a wiping doctor 41, which in cooperation with the surface structure 21 of the roll 2 ensures that the depressions will be filled with synthetic resin and the surplus will be wiped off when the roll rotates in the direction of the arrow shown in the drawing. The roll 2 comprises a cylindrical shell, which is mounted on rollers so that the cavity of such drum-like roll may accommodate a stationary pipe, which has perforations through which, e.g., compressed air can be supplied, which flows out toward the hopper 4 so that the structure 21 is cooled as it moves past the outlet opening of the hopper 4. By this action, the tackiness of the particles of plastics material can be temporarily eliminated so that the depression of the structure 21 can be filled without difficulty. Instead of cup-shaped depressions, boss-like projections may be provided and be spaced such distances apart that each projection adjoins a depression which can accommodate one or more grains of synthetic resin. Such aggregations of the grains may have been formed artificially by agglomeration. In such case, the wiping doctor 41 is suitably replaced by a rolling doctor, which in addition to a heavy core may carry a resiliently yielding cover, which promotes the doctoring of the synthetic resin into the structure 21. The contact pressure roll or press-forming roll 3 is disposed opposite to the roll 2. The roll 3 is mounted on an axle 31, which is engaged by a yoke 32, which is acted upon by a spring 33, which bears on a stationary abutment 34. The cylindrical rings 35 are fitted on the end portions of the axle 31 and are guided between the sliding shoes 36,37. In this way, a contact pressure or forming pressure is applied to the support web 11, which consists of cellulose or foam and has been introduced into the nip 38, 39 between the rolls 2 and 3. Another stationary pipeline may be provided in the cavity of the drum-like roll 2 near the common point or contact between the rolls 2 and 3 and the support web 11 of cellulose or foam and this additional pipeline may comprise perforations which face said common point of contact. If this second pipeline is connected to a source of hot air, the temperatures at the point of contact will be higher than those at the remaining portions of the roll 2. As a result, the particles of synthetic resin which have been received are somewhat tacky so that they adhere to the web 11 of cellulose or foam and are carried along by the same, which is thus provided with particles of synthetic resin in the desired distribution. These measures, however, are only supplemental. Because the web 11 of cellulose or foam is subjected to the contact pressure exerted by the roll 3, elements of the web 11 of cellulose or foam enter the depressions or the spaces between the boss-like projections. These elements of the web 11 contact the particles of synthetic resin and carry the latter along mechanically in an entirely sufficient degree.

An endless belt conveyor 51 is disposed below the means 1, 2, 3, 4. Additional means for treating the support web 11 are disposed along the length of the belt 51. For this purpose, the conveyor belt 51 is trained around pulleys 52, one of which is driven. The conveyor belt is arranged so that the web 11 of cellulose or foam can just pass between the bottom of the roll or drum 2 and the upper course of the conveyor belt 51. In the direction of travel of the web of cellulose or foam, the roll or drum 2 is succeeded by the infrared radiators 53, which transform the particles received by the web 11 of cellulose or foam into a state in which they are adhered and thus fixed to the web 11. The radiators are succeeded by a treating unit 54, e.g., in the form of a tunnel oven. The web 11 of cellulose or foam lying on the conveyor belt 51 traverses the unit 54 in the length which is required for a transformation of the web of cellulose or foam and the particles into the desired state. For instance, streams of hot air 55 may be directed onto the web and the particles at such a rate and temperature that the particles of synthetic resin are at least superficially sintered and may be completely sintered if this is desired. Because elevated temperatures of the web 11 of cellulose or foam are not desired during the further treatments, cold air nozzles 56, 57 are provided, which cool the web 11 of cellulose or foam and the particles of synthetic resin on one side of said web to room temperature.

Plastics material is applied to the rear side by means of apparatus 6 comprising a hopper 61 for a further supply of particles of synthetic resin, a doctor means 62, a roll 63 having a surface structure 64, a contact roll or contact pressure roll 65, a belt conveyor 66, infrared radiators 67 and a tunnel oven 68.

The final unit of the apparatus consists of a double calender 7 comprising calender rolls 71 and 72. In the tunnel oven 68, the particles on both sides of the support 11 have become tacky so that textile fabrics 81, 82 withdrawn from the rolls 83, 84 may be introduced into the nip between the rolls 71, 72. The resulting composite web has the desired properties and is then subjected to further processing, particularly to profiling by high-frequency welding with or without additional inserts, fillers, inserted or applied pads, because only those particles of synthetic resin which are disposed on the surface of the support 11 were used as bonding material when the webs 81, 82 were joined by calendering. The web of cellulose or foam is so thin that there are also particles inside the layers of cellulose or foam in an amount which is sufficient to enable them to act as bonding material during the subsequent high-frequency welding.

In this specification, the term dot pattern describes a distribution of the particles of synthetic resin in which these particles, on a statistical average, form spaced apart dots. Such a dot pattern will be automatically obtained as a loosely scattered pattern if the synthetic resin is applied electrostatically, under the action of high-voltage electrostatic fields. The field may be controlled so that the resulting lines of force are such that the electrostatically accelerated particles of synthetic resin form the desired dot pattern when they impinge on and penetrate the support. The support may be pretreated for this step, e.g., by moistening, which may be effected by very fine water sprays or by steaming.

The provision of particles of synthetic resin inside a support does not involve any difficulties because, as has been stated, the supports must be permeable to air and moisture so that they always have open pores, which can accommodate the particles of synthetic resin inside the support layer, particularly if the same is very thin but has an open profile. This is particularly the case with cellulose, non-woven fabrics and other textile fabrics.

If the support is highly delicate, e.g., if it consists of a very thin sheet of foam, it will be suitable to depart from the embodiment shown by way of example and to move the web along a vertical path. Such movement along a vertical or very steep path also enables the application of the particles of synthetic resin on both sides on the same level, e.g., by the electrostatic method discussed hereinbefore, so that the endless supporting, guiding and/or conveying belts discussed in conjunction with the illustrated embodiment and required in conjunction with delicate supports moved along a horizontal path may be eliminated. These supports moving along steep paths may be provided with the synthetic resin on different levels, of course, particularly when it is deemed desirable to provide synthetic resin on one side of the support first and then to subject said synthetic resin to treatments which are suitably completed before particles of synthetic resin are applied to the other boundary surface of the web.

Figure 2:
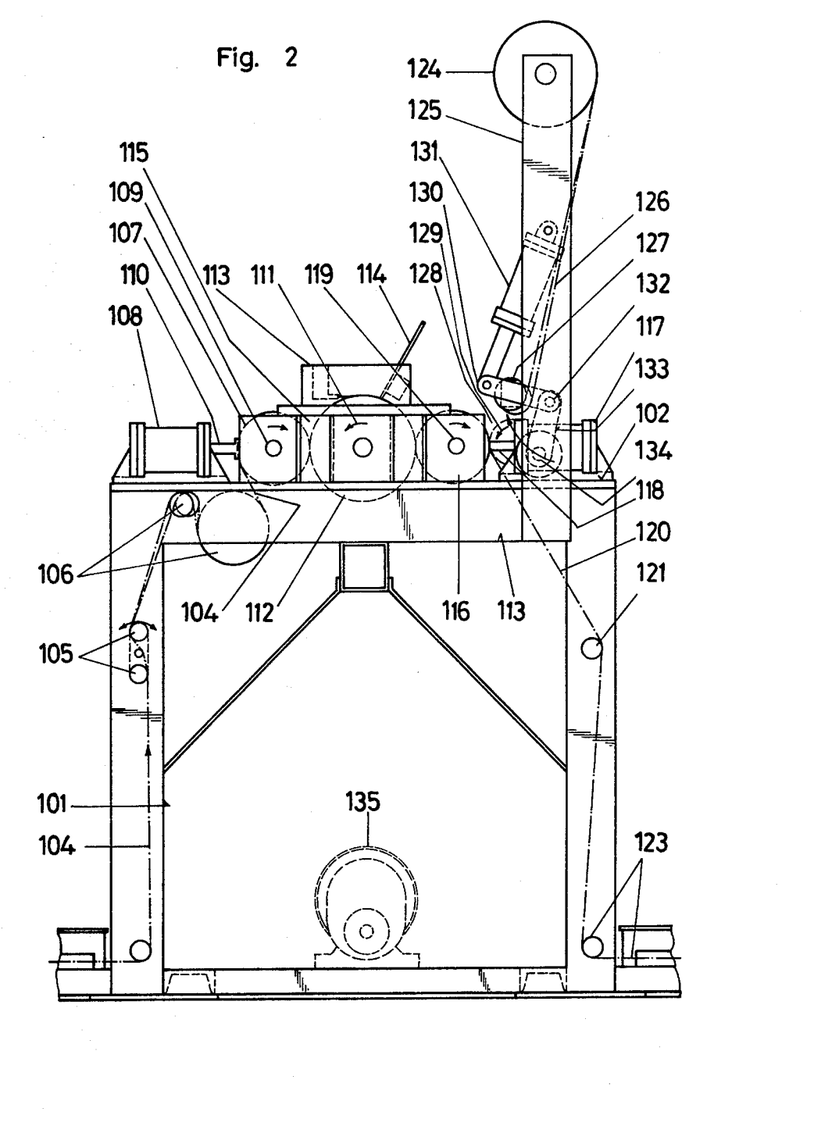
FIG. 2 shows another, simplified and smaller apparatus for the manufacture of a specially designed web for supporting particles of synthetic resin. An additional device is provided which enables the manufacture of a composite comprising such support web and a layer applied thereto.

FIG. 2 shows a much smaller and simpler plant for the manufacture of a support according to the present invention. The machine according to FIG. 2 comprises a U-shaped frame 101, which is open toward the foundation. The upper surface of the table top 102 of the U-shaped frame carries a number of units disposed along the path of a very thin web 104 consisting of cellulose or polyurethane ester foam. This web has a thickness of 1.00-1.50 millimeters if it consists of foam and will be much thinner if it consists of cellulose. The devices carried by the upper surface of the table top of the frame 101 are preceded in the path of the support web 104 by a tensioning and stretching device 105, which ensures that the support web 104 will have a perfectly flat and smooth configuration. The support web 104 is supplied by the reversing rollers 106 to the first press-forming roll 107, which is carried by the table top 102. The required pressure is produced by the cylinder-piston unit 108, which comprises a piston rod 110 connected to an axle 109 on which the pressforming roll 107 is mounted. The latter contacts a surface-structured intermediate roll 112, which rotates in the direction of arrow 111 and is provided with cooling and heating means which are not shown. As in the embodiment of FIG. 1, the structuring consists of recesses, which are formed in the peripheral surface of the roll 112 and have a size and distribution to match a synthetic resin particle of medium size and the desired distribution thereof. These lenticular recesses are disposed one beside the other on the surface of the roll 112 and do not substantially exceed in size that spherical cap which is formed on an assumedly spherical particle of synthetic resin generally having a size between 80 and 150 microns and faces the structured surface. This statement does not exclude exceptions residing in the use of smaller or larger particles. Such synthetic resin powder is placed into a hopper 113, which is disposed above a structured roll 112. Rolling and scraping doctors 114 are provided to restrict the rate at which synthetic resin powder is supplied to the recesses in the structured surface of the roll 112 to the total capacity of the roll 112 on the assumption that there is virtually only one powder particle in each recess. The roll is at a temperature which is higher than room temperature and which is selected so that the resulting operating conditions are such that a powder particle in a recess in the surface of the roll 112 will remain in this recess during the rotation of the roll. This will not involve difficulties if the heated powder particle is sufficiently tacky. The support web 104 enters a nip 115 between the rolls 107 and 112 and subsequently covers the entire lower hemicylinder of the roll 112 inclusive of the powder particles of synthetic resin therein so that the particles of synthetic resin received by the recesses formed by the surface structure of the rolls will be unable to leave their position even if there is a lack of adhesive forces which could hold the particles in position. A press-forming roll 116 is also provided with cooling or heating means and operates under such conditions that the combination of mechanical and thermal actions results in a removal of the support 104 together with the particles of synthetic resin from the roll 112. The mechanical actions are again exerted by a piston-cylinder unit 117, which by a piston rod 118 acts on the mounting for a shaft 119, which carries the press-forming roll 116. The above-mentioned cooling and/or heating means, not shown, are provided for exerting the thermal actions. It appears suitable to maintain at the surface of the roll 116 a somewhat higher temperature than at the structured surface of the roll 112 so that there is an increased safety that the particles of synthetic resin disposed in the recesses of the structured surface of the roll 112 are in fact transferred from the surface of the roll 112 to the support 104.

If a finishing material thus made is to be joined in the same machine to another layer to form a composite material in such a manner that the existing bonding tendency of the finishing material is utilized or partly or completely re-established, that other layer, which may consist, e.g., of a foam layer, may be withdrawn from a roll, which has been wound on a reel 124, which is carried by a mount 125 supported by the frame 101. That layer of the composite material which is to be bonded to the finishing material 104 is designated 126 and moves around a deflecting and tensioning roll 127 to the nip between the press-forming roll 116 and another pressure roll 129 provided for this purpose. The tensioning roll 127 is under the influence of a tensioning lever 130, to which a piston-cylinder unit or a tension spring 131 is pivoted. The tensioning lever 130 is pivoted by an articulated joint 132 to one end of a rocker lever 133, which is pivoted at 134 to the frame 101 or the piston-cylinder unit 117. The piston-cylinder unit 108 and 117 may obviously be replaced by biasing springs or biasing weights which are adjustable as to spring stress or weight and/or lever arm. A means for driving the entire arrangement is indicated at 135.

Cooling and/or heating are suitably effected by cooling and heating liquids consisting, e.g., of liquid sols, oils, diphenyl, polyglycols and other inert liquids. Alternatively, a direct cooling, e.g., by Peltier elements, or directly acting heating means consisting, e.g., of electric heating coils, steam pipers etc., may be used.

Figure 3:
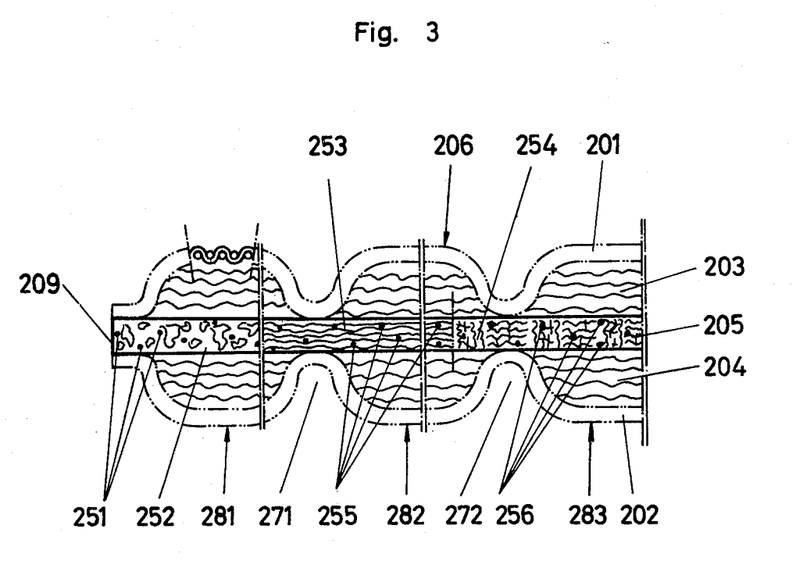
FIG. 3 shows a first embodiment of a web according to the invention.

FIG. 3 is an enlarged sectional view showing diagrammatically a web according to the invention. Upper and lower facings are indicated at 201 and 202, respectively. Fillers 203 and 204 in the form of non-woven fabrics are disposed between the facings 201 and 202.

Such fillers may consist of all fiber materials having properties enabling their use as fillers. These materials include particularly natural and man-made fibers. In this connection, natural fibers include plant and animal fibers and man-made fibers include fibers of natural and synthetic raw materials. A support 205 for the bonding material is also provided. The bonding material is diagrammatically indicated by synthetic resin particles 251 of modified polyamides. The intermediate layer 205 has been shown to be divided into sections 252, 253, 254, in order to indicate that as shown, e.g., at 252 the support for the particles 251 of synthetic resin may consist of a foam layer, which may preferably consist of foamed plastics material, such as polyurethanes. Reference numeral 253 indicates that one or more layers of non-woven fabric may be used to form the intermediate layer 205. Particles of synthetic resin incorporated therein are indicated at 255. The section 254 illustrates that cellulose may be used as a support for synthetic resin particles 256 consisting of modified polyamides. Alternatively, a spun-bond fabric may be used, although the same is not shown in the drawing. Any material may be used which is capable of accommodating synthetic resin which is in a suitable form and has been applied or incorporated, and of holding said synthetic resin in position. A three-dimensional profile is indicated at 271, 272 and formed by the application of high-frequency electrodes at these points. The shaping of the bonding layer 205 has not been shown in order to avoid a disturbance of the showing of the sections consisting of different materials. It will be understood that the three-dimensional profile which is due to the high-frequency welds 271, 272 is formed also in the bonding layer 205 so that the deformation affects the synthetic resin particles 251, 255, 256 and the entire stack of layers 201, 203, 205, 204, 202. The simultaneous welding of the layers at 271 and 272 results in the three-dimensional profile. Before the invention, such profile could be formed only by the provision of quilted means, particularly of ornamental quilted seams, at these points. The function of the stitching threads is now performed by the synthetic resin particles 251, 255, 256, etc. and three-dimensional profiles are formed in a configuration which corresponds to the arrangement and shape of the high-frequency electrodes, which are not shown themselves. Outside the seam welds, the fillers 203 and 204 remain in their original shape to form resilient pads indicated at 201, 202, 203. The same high-frequency welding may be utilized to seal the web 208 at 209 and to join the filler layers 203 and 204 disposed there and the intermediate bonding layer 205 by an integral, compressed seam. It will be understood that trimming ribbons and other known means may be used at 209 to impart a pleasing appearance to the web 200 in a section thereof which is used, e.g., to make a quilt.

Figure 4:
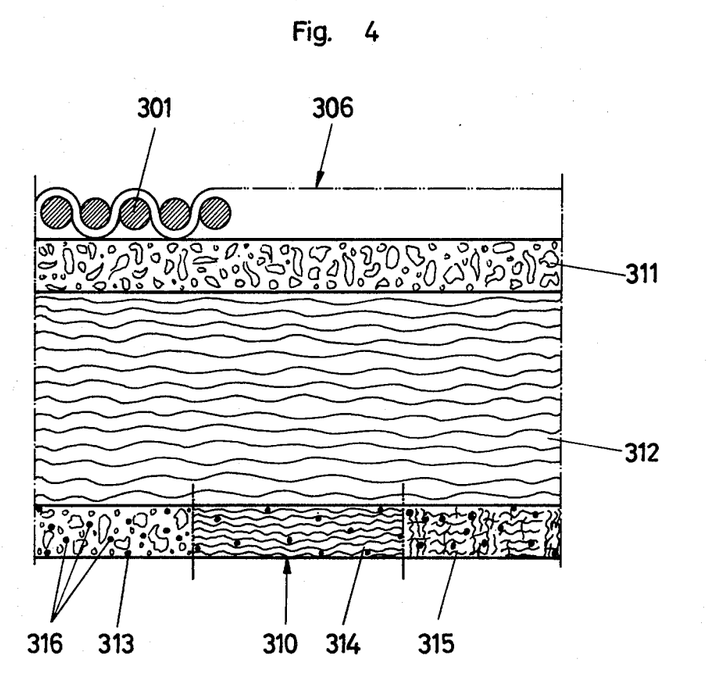
FIG. 4 shows also diagrammatically another embodiment of the web.

In the embodiment shown in FIG. 4, a bonding layer 310 is provided on one side of a web 306, which on the opposite side is provided only with an upper facing 301. A foam layer 311 and a filler layer 312 consisting of a non-woven fabric are disposed between the web 301 and the bonding layer 310. The bonding outer layer may consist of foam, as is indicated by section 313, or of a non-woven fabric, as is indicated by section 314, or of cellulose, as is indicated by section 315, or of a spun-bond layer, which is not shown. These sections have been shown to succeed each other in the longitudinal direction of the web only in order to facilitate the representation. It will be understood that the bonding layer 310 may consist of individual layers which consist of the same materials as the sections 313, 314, 315 etc. and which succeed each other in a direction which is at right angles to the direction in which the sections 313, 314, 315 etc. succeed. Regardless of the composition of the bonding layer 310, it will also comprise applied or embedded particles 316 or 315 of synthetic resin so that the same requirements are met as in the web of FIG. 3 regarding the shaping of the web into a three-dimensional profile, which is not shown in FIG. 4. The invention extends the field of application of finishing materials in general and enables the use of such materials in composite materials having layers which are so sensible to elevated temperatures that it was difficult or impossible to use then in a composite material. Thorough tests have shown that it is possible, e.g., to provide a composite material containing a layer which consists of very fine downs and which is fixed by seam welds which correspond to quilting means and have been made under pressures and temperatures which are relatively low and harmless and which result in an arrangement of the downs in a certain pattern, in which the downs have their full bulk resiliency close to the seam welds so that they exhibit in the cushions defined by the seam welds a behavior which was achievable before only by the provision of hand-stitched quilted seams corresponding to the weld lines. The product thus gives the impression of being hand-made. It has been stated, however, that the processes employed permit of the use of consecutive machines in the manufacture of quilts of a kind which previously could not be made by machine. The above remarks made with reference to fine downs and other materials of organic origin are also applicable to soft and fine-pored foamed plastics materials. It is generally stated that the new finishing material may be used for purposes for which it was not possible before to use lines of machines in cyclic and quantity production processes. These applications include, e.g., the manufacture of seats, seat backs, door linings, side part linings for use by the motor vehicles industry; side parts of easychairs and couches, seat cushions for easychairs and couches, back cushions for easychairs and couches, complete couch seat covers in one piece, couch backs in one piece, profiled backs for upholstered furniture (these could be made before only by manual stacking), mattress cover plates, mainly in one piece, with the usual quilting ornaments, for use by the mattress industry; facings for use on parts of furniture and wall surfaces, which facings comprise weld-profiled sheetings, for use by manufacturers of furniture and room decorations; mattress covers, health-promoting mattress cover pads, diamond pattern covering feathrebeds, covered blankets, quilts filled with fibers, downs and feathers, blankets for daytime use, pillows filled with washable synthetic fibers, for use by manufacturers of bed goods; filled dressing gowns, anoraks and sleeping bags, for use by garment makers; material for camping purposes, comprising heat-insulating, upholstered tent walls, tent flooring, tent mattresses, tent pads, tent sleeping bags, tent blankets, tent partition walls, ceiling-like horizontal partitions, facings for easychairs and chairs for use in tents, and wall and ceiling linings for camping vans and other items therein. The above listing does not claim to be complete but shows that finishing materials according to the invention may be used in general for welding any textile fabric or three-dimensional textile structure regardless of the nature and composition of the fiber material. The finishing material may also be used with natural leather, particularly for upholstery purposes, also with artificial leather, plastics material sheeting covered with textile fabrics, plastics material sheeting alone, or the like. Besides, the welding to paperboard, carton and other backings of textile or other character without need for any preparatory work, or to metallic backings, metal foil, sheet metal, metal plate and any combinations of such material and structures which are formed thereby and attached to or incorporated in or built around other structures, is not excluded. It has been mentioned hereinbefore that layers or parts and/or bodies of composite materials may also consist of foams or foam bodies which are independent of the nature of the finishing material, and that the new finishing material may be used on the outer boundary surfaces of layers, parts and/or bodies as well as in the form of intermediate layers, intermediate parts and/or intermediate bodies.

It is inherent in the nature of the invention that the reference to sintering temperatures includes temperatures at which the particles are tacky. Specifically, higher temperatures which are below the melting or sintering temperatures may be sufficient in special cases to produce the technical results for which they are used.

It has been stated hereinbefore that polyamides are available which have an excellent resistance to water and almost all conventional solvents, and do not exhibit embrittlement or other signs of ageing, e.g., as a result of a change in plasticizer content by evaporation or otherwise, so that these polyamides may be used in composite materials from which textile products can be made which do not tend to become as stiff as boards and which maintain their textile hand even when worn for a prolonged time and when dry-cleaned several times. This statement relates particularly to a resistance to hydrocarbons (gasoline, benzene, xylene, etc.), and chlorinated hydrocarbons (ethylene trichloride, carbon tetrachloride, ethylene perchloride etc.). Composite materials made according to the invention may be subjected to the action of acids of low concentration and of alkaline solutions with negligible effect. They are soluble in mixtures of lower alcohols (methanol, butanol etc.) and water only when heated at the same time, and any initially formed solution will be stabilized in 1:1 mixtures of methanol and methylene chloride at room temperature when a concentration of 20% has been reached. Such copolyamides perfectly resist warm water and swell only slightly in boiling water. Hence, they can be washed at temperatures up to 80° and perfectly resist all usual dry-cleaning processes.

Figure 5:
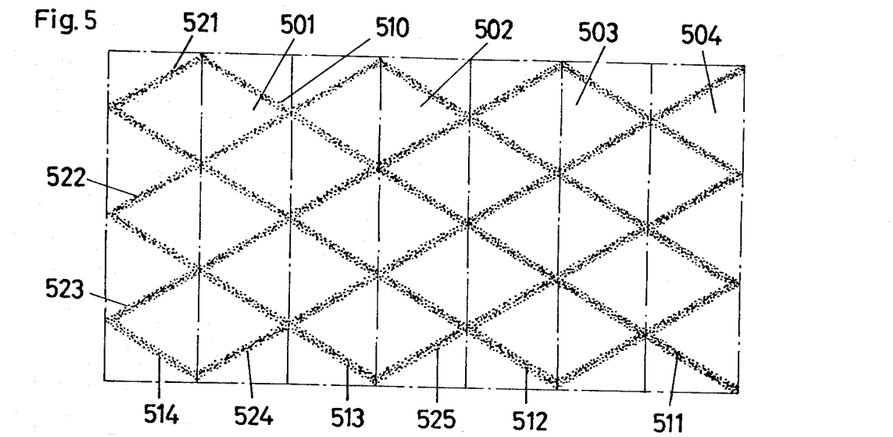
FIG. 5 is a fragmentary top plan view showing an engraved roll, such as has been shown in FIG. 1 as items 2 and 6 and provided with an engraved pattern 21 or 62 and in FIG. 2 as item 12.

FIG. 5 indicates how synthetic resin particles transferred to the support, e.g., in a pattern corresponding to the engraved pattern of the engraved rolls 2 and 6 in FIG. 1 and engraved rolls 12 in FIG. 2 form a line pattern, which surrounds parallelogram fields having equal side lengths. These fields are indicated at 501, 502, 503, 504 etc. in FIG. 5 and are not provided with particles of synthetic resin. The fields 501, 502 etc. are surrounded by fields 510, 511, 512, 513, 514 etc. and 521, 522, 523, 524, 525, 526, etc. in the form of very narrow, elongated strips, which are provided with particles. The mutually opposite sides of the paralellograms have the same length so that the particles form the uniform pattern of arrays shown in FIG. 5.

Figure 6:
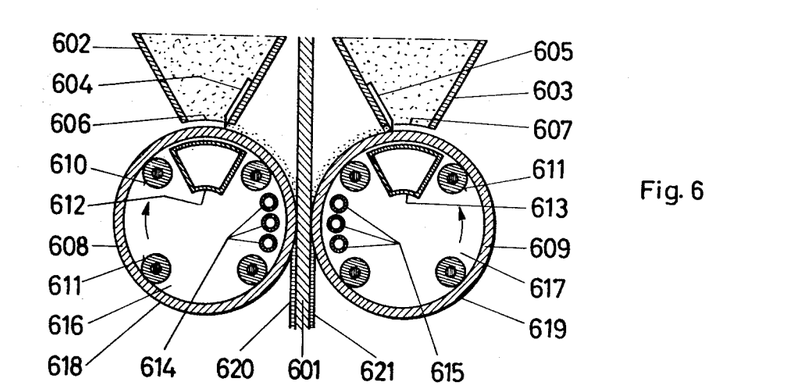
FIG. 6 is a diagrammatic view showing an apparatus according to the invention for use in a process in which a moving support web for the particles of synthetic resin is to be provided on both boundary surfaces with said particles of synthetic resin in an array and distribution which are prescribed by the engraved patterns of the two rolls serving to apply such particles.

FIG. 6 shows an embodiment of the invention for use in a process in which a moving support web 601 is to be provided with particles of synthetic resin on both sides. The means used for this purpose are generally similar to the engraved rolls 2 and 6 in FIG. 1. It is apparent that hoppers 602 and 603 are provided for the particles of synthetic resin to be applied to the support 601, which is moved in a downward direction. Doctor means are indicated at 604, 605. These wiping doctors may be replaced by rolling doctors. Openings 606, 607 of the hoppers are in register with annular rolls 608, 609, which are supported at their inside periphery by supporting rollers 610, 611. Cooling air flows through the cavities of segment-like ducts 612, 613 disposed between the outlet openings 606, 607 of the hoppers 602, 603. In addition to the cooling air ducts 612, 613, steam pipes 614, 615 are disposed in cavities 616, 617 of the annular rolls 608, 609 so that the support web 611 passing through the nip between the annular rolls 608, 609 is heated to a temperature at which the particles of synthetic resin received at 606, 607 from the hoppers 602, 603 begin to plasticize. Due to this arrangement, the powder particles of synthetic resin disposed in the hoppers 602, 603 are received at relatively low temperatures in the engraved pattern, not shown, on outside peripheral surfaces 618, 619 of the annular rolls 608, 609. Owing to this low temperature, the particles are not tacky and readily enter the engraved pattern provided to receive these particles. As a result, the particles are distributed as is represented by the line pattern of FIG. 5 if the engraved patterns, not shown, in the peripheral surfaces 618, 619 are filled with particles of synthetic resin whereas no particles are applied to parallelogram fields 501, 502, 503 504 etc. disposed between the recesses formed by this engraved pattern. In this condition the peripheral surfaces 618, 619 of the rolls contact the support 601. As the annular rolls 608, 609 are provided with pressure-applying devices indicated in FIG. 1 at 31-37 and the particles are very tacky because they begin to plasticize under the action of the stem pipes 614, 615, the particles are transferred to the boundary surfaces of the support 601 exactly in the intended distribution shown in FIG. 5. This distribution is indicated by reference numbers 620, 621.

Figure 7:
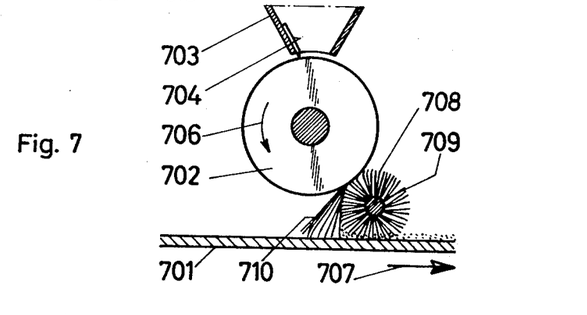
FIG. 7 shows an embodiment of the apparatus according to the invention in which there are no thermal treating means intended to ensure the distribution of the particles on the web to be provided therewith but the transfer of the particles to the receiving support web is effected in a strictly mechanical way by brushing.

FIG. 7 shows a simpler apparatus for transferring particles to a support 701 in an arrangement and distribution which is prescribed by the engraved pattern of a roll 702. The apparatus comprises a hopper 703 for the particles of synthetic resin and a wiping doctor 704. The particles of synthetic resin enter through an opening 705 of the hopper 703 the engraved pattern, not shown, of the roll 702 and are entrained by said pattern in the direction of arrow 706. A first part of the particles falls out of the engraved pattern under the action of gravity onto the upper boundary surface of the support 701, which is advanced in the direction of arrow 707. These particles which do not fall under the action of gravity out of the engraved pattern of the roll 702 are brushed out of the engraved pattern of the roll 702 by bristles 708 of a brush having a drive shaft 709 because the support 701 is disposed in the range 710 in which the particles are brushed out.

The invention resides in each of the disclosed features thereof which have been disclosed even though such feature may have been described only in combination with other features, as well as in any practicable combination of part or all of such features, provided that the individual features and combinations of parts or all of said features are technically desirable, practicable and useful, although novel technical results which can be obtained may not have been specifically described. All details which are apparent from or have been described in the specification and/or claims and/or shown in the drawings, and any desired combination of such features, are considered to be described and claimed together with their function or functions as well as with the functional relation or relations which are inherent in combinations of parts or all of said details.

I claim:

1. A process for producing a composite structure, particularly a rustle-free composite structure which is permeable to gas, vapor and liquid and which is resistant to the action of detergents and dry cleaning agents, comprising the steps of forming a patterned arrangement comprised of a plurality of spaced-apart depressions on an exterior surface of a support member; advancing sequential portions of said surface beneath a filling station; cooling each of said sequential surface portions as it travels beneath said filling station; filling said spaced-apart depressions at said filling station with at least one discrete powder particle of dipolar plastic material by permitting gravity descent of said powder particles from said filling station towards said depressions as the support member passes beneath the filling station, the cooling of each of said sequential surface portions as it travels beneath said filling station preventing the initiation of plasticization of the powder particles and thereby insuring proper entry of the latter into said depressions; advancing a sequential surface portion upon filling of said depressions thereof towards an applicator station; preheating a flexible support web so as to cause said powder particles to become tacky over the area of their surfaces facing outwardly and towards said flexible support web; and contacting the respective sequential surface portion at said applicator station with at least one boundary surface of said flexible support web which is permeable to gas, vapor and liquid, and transferring said tacky particles from said depressions onto said one boundary surface so as to form and bond said patterned arrangement thereon.

2. In a process as defined in claim 1; and further comprising the steps of superimposing a layer in pressure-contact with said support web upon said patterned arrangement of particles; and forming high-frequency weld lines along said layer and said support web which are bonded together by melting the particles which have a high loss factor so that the particles will melt when subjected to high-frequency fields.

3. In a process as defined in claim 1, wherein the step of superimposing includes applying at least one layer of textile material to said one boundary surface of said support web and subjecting said layer of textile material and said support web to the action of a high-frequency field so as to form flexible weld seams of sufficient strength between said layer of textile material and said support web.

4. In a process as defined in claim 3, and including the step of moving said high-frequency field and said layer together with said support web relative to each other.

5. In a process as defined in claim 1, wherein said discrete particles of dipolar plastic material are applied in a line pattern to said flexible support web in such a manner that the areas of said support web remaining free of said particles are considerably greater than the areas to which said particles are applied.

6. In a process as defined in claim 1, wherein said particles consist of modified polyamides.

7. In a process as defined in claim 2, wherein said step of forming weld lines includes the step of applying electrodes to opposite sides of said composite structure, and creating a high-frequency field between the electrodes so as to melt said plastic particles to thus create weld seams connecting said support web and said layer to each other.

8. In a process as defined in claim 1, and including the step of moving said support web along a substantially vertical path, and applying during such movement said particles to opposite boundary surfaces of said support web.

9. In a process as defined in claim 1, and including the step of moving said web along a substantially vertical path, and applying during such movement and under application of heat and pressure said particles to opposite boundary surfaces of said support web.

10. In a process as defined in claim 1, and including the step of additionally heating said particles to plasticize the same, and applying at least one additional layer to said support web while said particles are still in a plastic state.

11. In a process as defined in claim 1, wherein said support web is a continuous web, and including the step of moving said web in longitudinal direction while applying said particles first to said one boundary surface of said web, heating said moving web and said particles thereon to at least incipient plasticization of said particles, cooling said moving web and said particles thereon, applying such particles to the opposite boundary surface of said web, again heating said moving web to at least incipient plasticization of said particles on both of said boundary surfaces, and applying a pair of additional continuous webs to opposite boundary surfaces of said first mentioned web.

12. In a process as defined in claim 2, and wherein the step of forming includes forming a line pattern for said discrete particles.

13. In a process as defined in claim 2, wherein said particles are at room temperature during forming of said line pattern.

14. In a process as defined in claim 2, and including the step of fixing said particles in said line pattern to said support web.

15. In a process as defined in claim 14, wherein said particles are fixed by application of pressure to said support web.

16. In a process as defined in claim 14, wherein said particles are fixed by application of heat to said support web.

* * * * *